(12) United States Patent
Hofmann

(10) Patent No.: US 12,172,877 B2
(45) Date of Patent: Dec. 24, 2024

(54) TELESCOPIC PICK-UP FOR MOVING CONTAINERS IN HIGH-BAY WAREHOUSES

(71) Applicant: AMOVA GmbH, Netphen (DE)

(72) Inventor: Karl Robert Hofmann, Netphen (DE)

(73) Assignee: AMOVA GmbH, Netphen (DE)

( * ) Notice: Subject to any disclaimer, the term of this patent is extended or adjusted under 35 U.S.C. 154(b) by 1017 days.

(21) Appl. No.: 17/043,789

(22) PCT Filed: Apr. 16, 2019

(86) PCT No.: PCT/EP2019/059762
§ 371 (c)(1),
(2) Date: Sep. 30, 2020

(87) PCT Pub. No.: WO2019/201896
PCT Pub. Date: Oct. 24, 2019

(65) Prior Publication Data
US 2021/0147204 A1    May 20, 2021

(30) Foreign Application Priority Data
Apr. 18, 2018   (DE) ............... 10 2018 205 933.0

(51) Int. Cl.
*B66F 9/14* (2006.01)
*B65G 1/04* (2006.01)
*B66C 1/66* (2006.01)
*B66F 9/07* (2006.01)

(52) U.S. Cl.
CPC .............. *B66F 9/14* (2013.01); *B65G 1/0407* (2013.01); *B66C 1/663* (2013.01); *B66F 9/07* (2013.01)

(58) Field of Classification Search
CPC .......... B66F 9/14; B66F 9/07; B66F 2700/09; B65G 1/0407; B66C 1/663
See application file for complete search history.

(56) References Cited

U.S. PATENT DOCUMENTS

| | | | | |
|---|---|---|---|---|
| 3,677,599 | A | * 7/1972 | Shannon | ............ B66C 1/663 |
| | | | | 294/81.53 |
| 4,007,843 | A | * 2/1977 | Lubbers | ............ B65G 1/0414 |
| | | | | 414/273 |
| 4,331,419 | A | 5/1982 | Perrott | |
| 4,549,841 | A | 10/1985 | Ishige | |
| 5,004,071 | A | * 4/1991 | Mallard | ............ A62B 35/04 |
| | | | | 410/82 |
| 5,380,138 | A | * 1/1995 | Kasai | ............ B65G 65/00 |
| | | | | 414/277 |
| 6,431,379 | B1 | 8/2002 | Kröll et al. | |

(Continued)

FOREIGN PATENT DOCUMENTS

| | | |
|---|---|---|
| CN | 103443015 B | 7/2015 |
| DE | 1556324 A1 | 2/1970 |

(Continued)

*Primary Examiner* — Stephen A Vu
(74) *Attorney, Agent, or Firm* — Smartpat PLC

(57) ABSTRACT

Telescopic pick-up (100) for picking-up and moving a container (4, 34) in a high-bay warehouse (1), preferably a transshipment facility of a sea port or inland port, with at least one displaceable telescopic arm (120) at which a pick-up (130) for holding the container (4, 34) by way of a support (140) is mounted, wherein the support (140) supports the pick-up (130) to be movable along at least one direction.

16 Claims, 13 Drawing Sheets

(56) References Cited

U.S. PATENT DOCUMENTS

| | | |
|---|---|---|
| 2003/0047529 A1 | 3/2003 | Dobner et al. |
| 2004/0100111 A1 | 5/2004 | Stinis |
| 2004/0126211 A1 | 7/2004 | Barry |
| 2013/0334157 A1 | 12/2013 | Lappalainen |
| 2015/0336472 A1* | 11/2015 | Tanaka .................. B60L 13/006 104/118 |
| 2016/0347543 A1 | 12/2016 | Heide et al. |
| 2019/0077638 A1 | 3/2019 | Karlsson et al. |
| 2021/0206604 A1 | 7/2021 | Karlsson et al. |

FOREIGN PATENT DOCUMENTS

| | | |
|---|---|---|
| DE | 3244468 A1 | 6/1983 |
| DE | 19539914 C2 | 5/1996 |
| DE | 9321200 U1 | 7/1996 |
| DE | 19957823 A1 | 5/2001 |
| DE | 60102923 | 4/2005 |
| DE | 102008007860 A1 | 10/2009 |
| EP | 1272414 A1 | 1/2003 |
| GB | 1205499 A | 9/1970 |
| JP | 2017509561 A | 4/2017 |
| KR | 200291098 Y1 | 10/2002 |
| KR | 20030059941 A | 7/2003 |
| KR | 20080034696 A | 4/2008 |
| KR | 20160110951 A | 9/2016 |
| TW | 201532928 A | 9/2015 |
| WO | 2013175063 A1 | 11/2013 |
| WO | 2015124342 A1 | 8/2015 |
| WO | 2017135851 A1 | 8/2017 |

* cited by examiner

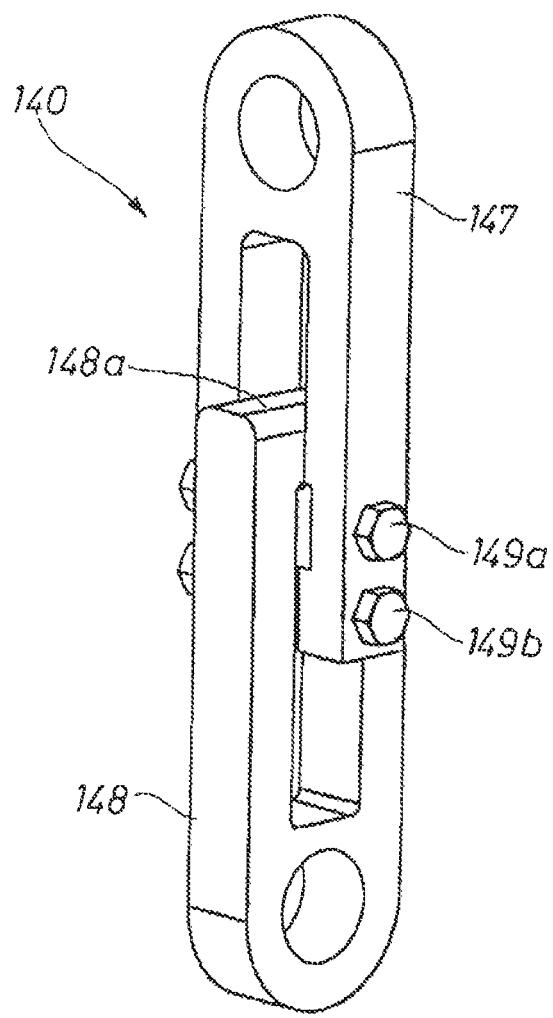

TELESCOPIC PICK-UP FOR MOVING CONTAINERS IN HIGH-BAY WAREHOUSES

TECHNICAL FIELD

The disclosure relates to a telescopic pick-up for picking up and moving a container in a high-bay warehouse, preferably a transshipment facility of a seaport or inland port. The disclosure further relates to a storage and retrieval unit and to a high-bay warehouse.

BACKGROUND

Transshipment facilities are used for reloading of containers between different transportation facilities, for example in a seaport or inland port. A transshipment facility usually comprises a container warehouse constructed as, for example, a high-bay warehouse in which the containers are stored in multi-level rack bays. Loading into, unloading from, and redisposing containers in the high-bay warehouse are carried out by storage and retrieval units, now partly or completely automatically, these being constructed as, for example, load cranes.

Stacking of containers on one another by means of a bridge crane such as described in, for example EP 1 272 414 B1 does indeed enable compact storage in height direction but prevents flexible storage and retrieval of the containers. For this reason, technologies are known which allow loading of containers individually into rack bays one above the other and adjacent to one another, whereby container transfer in a desired sequence can be realized. Thus, DE 10 2008 007 860 A1 describes a transport and transfer system for containers in which the containers with end face foremost are introduced into and removed from rack bays of a high-bay warehouse by means of gantry cranes. An alternative transshipment facility is evident from DE 93 21 200 U1 in which the containers are stored in and removed from rack bays of a high-bay warehouse with their longitudinal sides foremost.

High-bay warehouses are usually of box-like construction with individual box girders as rack bays and require means such as, for example, rails for guidance of the containers as well as storage and retrieval units for loading, retrieving, and relocating the containers.

The storage and retrieval unit according to WO 2015/124342 A1 comprises raisable and lowerable telescopic pick-ups which store the containers with the longitudinal sides foremost in rack bays of a high-bay warehouse and remove them therefrom. This allows a space-spacing mode of construction of the high-bay warehouse with minimal width dimension of travel lanes. In addition, by virtue of the telescopic handling of the containers the high-bay warehouse manages without guide rails and box girders, whereby the rack bays can be constructionally simplified. Essentially, corner point supports suffice for support of the containers. As a result, the high-bay warehouse can be of particularly compact construction.

Technical measures for reducing the size of a high-bay warehouse, particularly dispensing with generously dimensioned rack bays, can as a consequence pose the problem that compensation for production tolerances of containers, deformations or damage, tolerances in positioning by the delivery transport technology and the like can be provided only with difficulty. As a result, it may be the case that containers are not transported by the storage and retrieval unit into the ideal position and ideal location and deposited in the rack bays.

SUMMARY

An object of the disclosure is to provide a telescopic pick-up for picking up and moving a container in a high-bay warehouse, preferably a transshipment facility of a seaport or inland port, which improves reliability of container transshipment in compact high-bay warehouses. The disclosure further relates to a storage and retrieval unit and to a high-bay warehouse with such a telescopic pick-up.

The object is fulfilled by a telescopic pick-up as disclosed, as well as a storage and retrieval unit as disclosed, and a high-bay warehouse as disclosed.

The telescopic pick-up serves for picking up and moving, i.e. particularly storing, removal from storage and redisposition, of containers in a high-bay warehouse, preferably a transshipment facility of a seaport or inland port.

The telescopic pick-up comprises at least one displaceable telescopic arm on which a pick-up for holding the container by way of a support is mounted. For preference, two telescopic arms, namely an inner and an outer telescopic arm, are provided, wherein in this case the pick-up is mounted on the inner telescopic arm. One or more telescopic arms are movable in and out along a displacement direction, whereby a particularly space-saving storage of containers in a high-bay warehouse is realised. This makes a substantial contribution to a compact mode of construction of the high-bay warehouse.

The pick-up is supported by the support to be movable along at least one direction.

Through the movable support, also termed 'floating support', the container in the held state is not rigidly connected with the telescopic pick-up, but can execute a compensating movement along one or more directions, whereby compensation for production tolerances of the container, deformations or damage, tolerances in the positioning by the delivery transport technology and the like can be provided. As a result, the container is transported to and positioned in the optimal location even in the case of specific departures from the norm, whereby more reliable container transshipment is realized. The dimensions of the rack compartments and travel lanes in the high-bay warehouse can be further reduced without loss in functionality, as a result of which the high-bay warehouse can be constructed in particularly compact manner.

The container is preferably picked up by the pick-up to be suspended, whereby container transshipment is possible in particularly space-saving manner. The pick-up preferably comprises means for holding and locking the container, for example one or more, preferably two, twist-lock bolts arranged to engage in corresponding openings at the container and to lock this to the pick-up.

The support in a first form of embodiment preferably comprises at least one cylinder/piston device with a cylinder and a piston mounted to be displaceable therein, wherein the cylinder/piston device is mounted at one end, preferably the side of the cylinder, on the telescopic arm and at the other end, preferably the side of the piston, on the pick-up and is so arranged that the pick-up is vertically movable relative to the telescopic arm. In that regard, 'vertical' means in the direction of gravitational force. Thus, compensation can be provided in technically reliable manner for deviations in vertical direction, especially for possible angular offset of the container.

It may be mentioned that directional and positional terms such as, for example, vertical direction, horizontal direction, horizontal plane, longitudinal side of the container, etc., are unambiguous by virtue of the construction of the high-bay warehouse and the standardization of containers in the current technical field.

According to a preferred form of embodiment the load at the pick-up, i.e. the vertical force, is measured by force cells and monitored by means of a monitoring system. In this way it is possible for forces which, for example, act at different places of the telescopic mount are kept below a maximum load so as to avoid excessive loading and damage.

For preference, the cylinder/piston arrangement further comprises a spring, for example a helical spring, which is so arranged that the cylinder/piston device can be extended and shortened in resilient manner by displacement of the piston in the cylinder. In this way, the pick-up has an unambiguous starting position relative to the telescopic arm, from which compensation for tolerances in one or more directions can be provided and to which the pick-up returns after load relief, i.e. delivery of the container.

Preferably, two cylinder/piston devices are provided, which are spaced apart in the displacement direction of the telescopic arm, preferably arranged at the two end sections of the pick-up. The cylinder/piston devices are preferably provided in the region of the twist-lock bolts, insofar as present.

The support preferably comprises at least one pendulating rod which is mounted by way of at least one joint, preferably constructed as a ball joint, on the telescopic arm and/or the pick-up so that the pick-up is movable relative to the telescopic arm substantially in the horizontal plane. With particular preference the pendulating rod is mounted at both ends by way of a joint. The cylinder/piston device can itself function as pendulating rod in synergetic manner. The thus-realized pendulating movement along one or more directions increases, in technically reliable manner, the number of degrees of freedom for tolerance compensation.

For preference, the telescopic pick-up comprises a displaceable outer telescopic arm, wherein in this case the other telescopic arm is an inner telescopic arm, which is mounted and guided by the outer telescopic arm to be displaceable along the displacement direction of the outer telescopic arm and relative to this. According to a preferred form of embodiment the outer telescopic arm has along the displacement direction, i.e. the length direction thereof, one or more, preferably two, outer guide profiles co-operating with guide rollers, which are rotatably mounted on a main housing of the telescopic pick-up, for the displacement of the outer telescopic arm. In this case, the outer telescopic arm can additionally have along the displacement direction, i.e. the length direction, thereof one or more, preferably two, inner guide profiles co-operating with guide rollers, which are rotatably mounted on the inner telescopic arm, for displacement of the telescopic arm. In this way, a telescopic pick-up making possible a particularly space-saving storage of containers in a high-bay warehouse is realized in technically reliable manner.

The telescopic pick-up preferably comprises at least one rack drive with at least one rack and at least one pinion meshing with the rack, wherein the rack drive is so arranged that the rotational movement of the pinion is converted into a linear movement of the rack, whereby the telescopic arm is displaceable, particularly movable in and movable out, in technically reliable manner. According to a preferred form of embodiment the rack drive for the outer telescopic arm comprises two racks provided between the outer guide profiles. One or more pinions meshing with the racks are in this case arranged at the upper side of a main housing of the telescopic pick-up. According to this preferred form of embodiment the rack drive for the inner telescopic arm comprises two racks on the inner telescopic arm itself. One or more pinions meshing with the racks are in this case arranged between the outer guide profiles of the outer telescopic arm. It may be mentioned that actuation of the telescopic arm can also be realized in a technically different way, thus the force transmission can take place, for example, by means of a chain, hydraulically/pneumatically or electrically/magnetically.

For preference, the floating or movable support is so arranged that a mobility of or tolerance compensation for the pick-up relative to the telescopic arm of up to +/−30 mm along one axis or both axes in the horizontal plane and/or +/−80 mm along the vertical axis can be realized.

In a further preferred form the support comprises at least two strap elements which are arranged to interengage and to be movable relative to one another and by way of which a movement of the support in a first direction as well as in a second direction perpendicular thereto is made possible. It is particularly preferred if these strap elements are provided to so interengage that they additionally also enable vertical movement of the strap elements relative to one another in a third direction. With particular preference this is achieved with especially simple means in that provided in the respective strap elements are appropriate slots within which the connecting elements of the strap elements are slidably arranged.

In this connection it is also particularly preferred if the strap elements are detachably connectible together by way of at least one bolt so as to assist maintenance and exchangeability of individual components by particularly simple measures.

A storage and retrieval unit for moving containers in a high-bay warehouse, preferably a transshipment facility of a sea port or inland port, comprises a raisable and lowerable lifting bridge on which at least one telescopic pick-up, preferably two or more telescopic pick-ups, according to the above description is mounted.

For preference, the telescopic pick-up or pick-ups is or are so arranged and disposed that the containers are held at the pick-ups of the telescopic pick-ups with a longitudinal side perpendicular to the displacement direction, whereby storage of containers in a rack bay of the high-bay warehouse with the longitudinal side foremost is realized. A particularly space-saving container redisposition in the high-bay warehouse is thereby possible.

For preference, more than two telescopic pick-ups are provided and/or one or more of the telescopic pick-ups is or are adjustably mounted on the lifting bridge, preferably to be displaceable perpendicularly to the end face of a picked-up container, whereby containers of different formats can be handled by the storage and retrieval unit.

A high-bay warehouse, preferably a transshipment facility of a sea port or inland port, comprises at least one travel lane and at least one storage and retrieval unit according to the above description, this unit being movable along the travel lane of the high-bay warehouse.

The high-bay warehouse preferably comprises a plurality of multi-level rack bays arranged for storage of containers, wherein the rack bays are constructed with corner point supports for reception of the containers. The containers are thus supported merely at the corner regions thereof, whereby the high-bay warehouse can be constructed in particularly compact manner.

Further advantages and features of the present invention are evident from the following description of preferred embodiments. The features described therein can be realized by themselves or in combination with one or more of the above-mentioned features insofar as the features do not conflict. The following description of the preferred embodiments is in that case made with reference to the accompanying drawings.

BRIEF DESCRIPTION OF THE DRAWINGS

FIG. 13 shows a perspective view of a further form of embodiment of a pick-up, which is supported in floating manner, at the head of a telescopic arm.

DETAILED DESCRIPTION

Preferred embodiments are described in the following with reference to the figures. In that case, the same, similar or equivalent elements in the figures are provided with identical reference signs and a repeated description of these elements is in part dispensed with so as to avoid redundancies.

Figure 1:
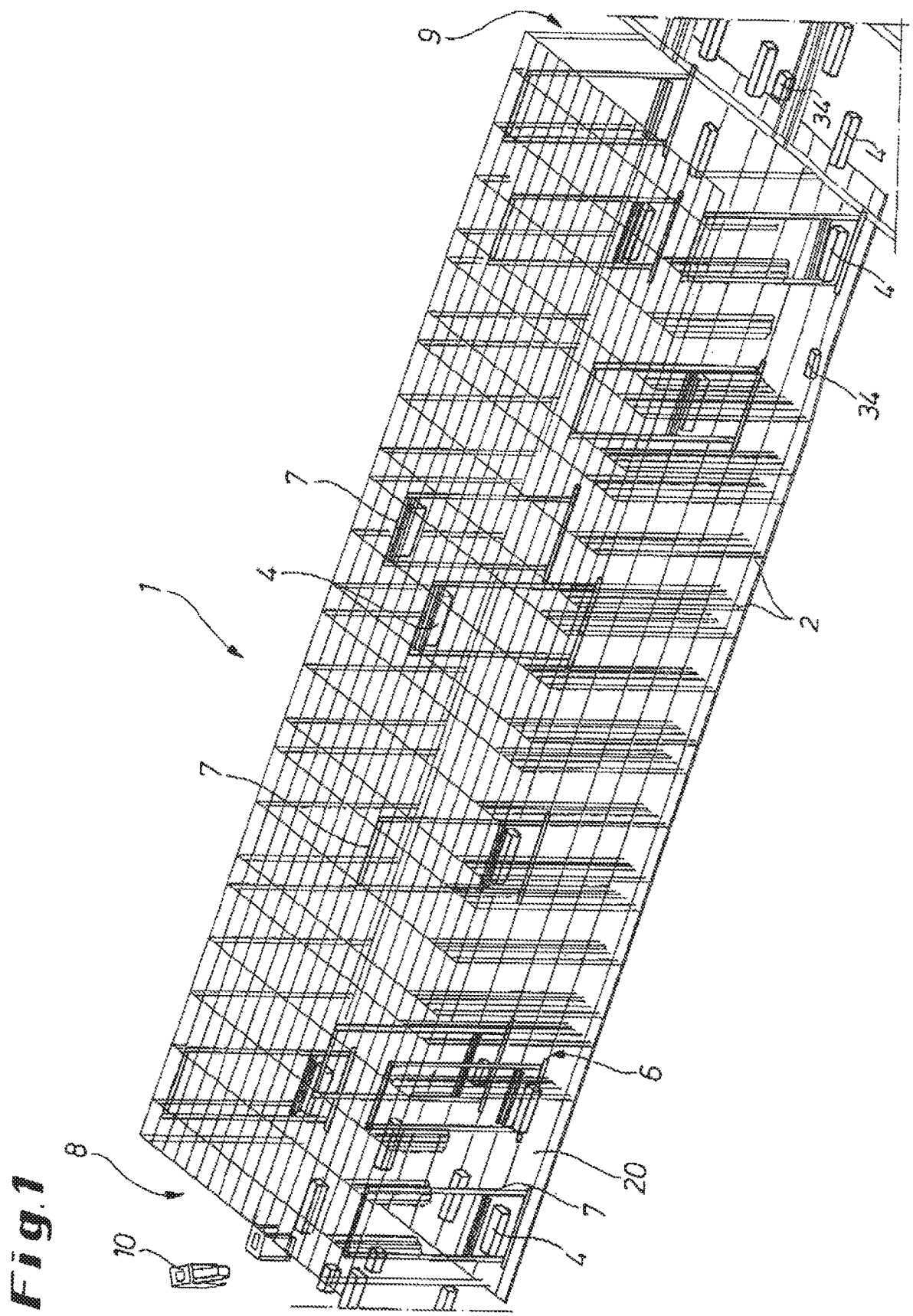
FIG. 1 is a perspective view which in schematic manner shows a high-bay warehouse with storage and retrieval units movable in travel lanes of the high-bay warehouse.
Figure 3:
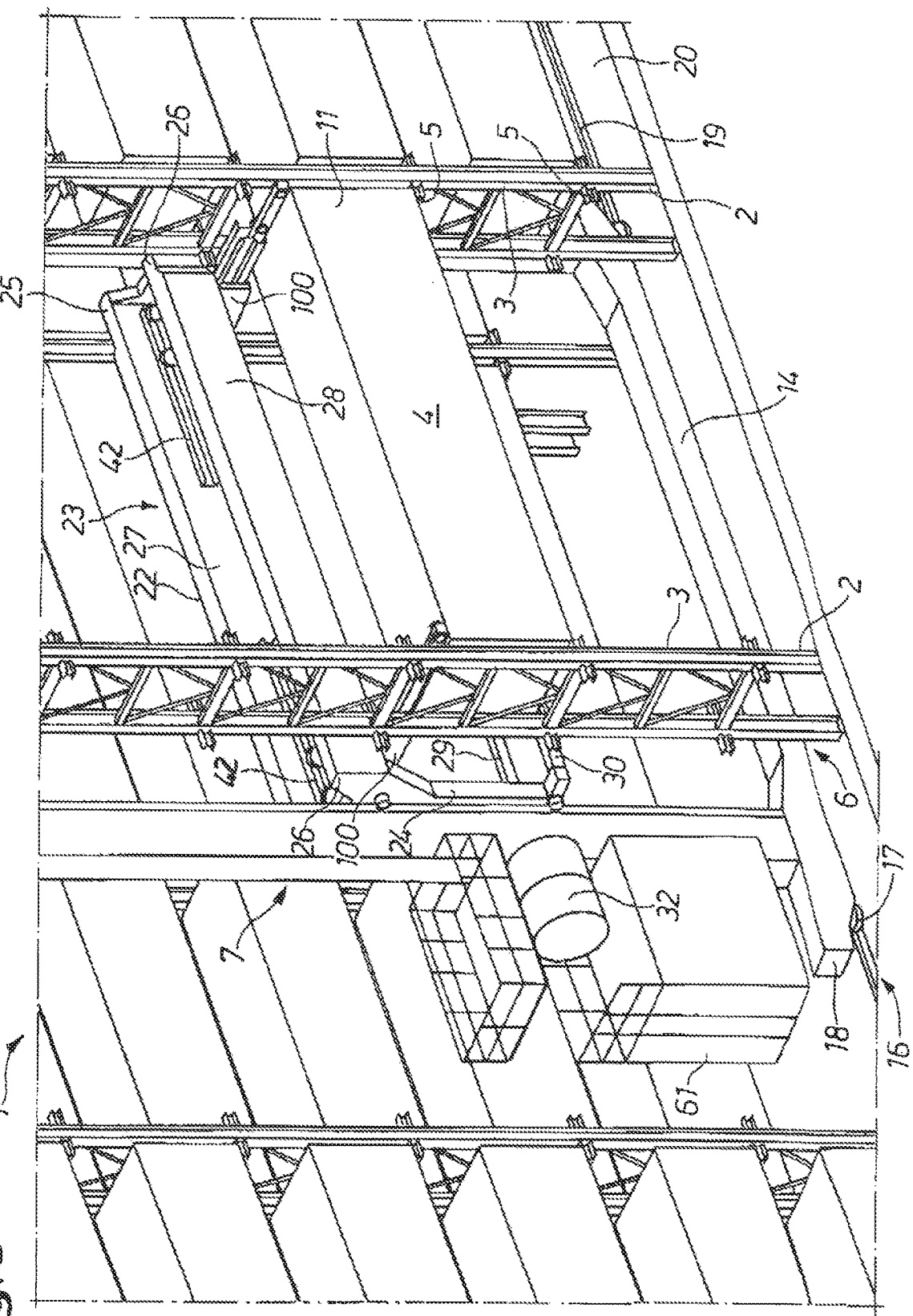
FIG. 3 shows a detail of the high-bay warehouse according to the embodiment of FIG. 1.

FIG. 1 shows a high-bay warehouse 1 comprising storage modules 2 arranged in rows. A detail to enlarged scale of the high-bay warehouse 1 is illustrated in FIG. 3. It is evident therefrom that rack bays 3, which are arranged in the storage modules 2 at multiple levels, for storage and removal of storage of containers 4 are provided. The rack bays 3 are constructed with corner point supports 5 for reception of the containers 4.

Travel lanes 6 which extend over the entire length of the high-bay warehouse 1 and in which movable storage and retrieval units 7 are disposed are formed between the storage modules 2. According to the present embodiment, the storage and retrieval units 7 are movable from both sides 8 and 9 of the high-bay warehouse 7 into the travel lanes 6 and serve for storage, removal from storage and repositioning— generally termed "moving"—of the containers 4. For this purpose, the containers 4 are delivered at one or both ends 8, 9 of the high-bay warehouse 1 with the longitudinal container sides parallel to the high-bay warehouse 1 at the respective travel lanes 6, for example by transport vehicles 10 and/or intermediate transfer means (not illustrated). The containers 4 after being delivered are picked up by the storage and retrieval units 7 in suspended position and transported by way of the travel lanes 6 to a rack bay 3 of a storage module 2, in which they are stored with a longitudinal side 11 foremost. For removal of a container 4 from storage, the storage and retrieval unit 7 takes the corresponding container 4 out of a rack bay 3 and transports it along the associated travel lane 6 to a discharge point, which in accordance with the present embodiment is present at the end 9 of the high-bay warehouse 1. There the container 4 is transferred for further transport, for example to a transfer means, or deposited.

It may be mentioned that the arrangement of the travel lanes 6 as well as the locations of the delivery and discharge of the containers 4 as shown in FIGS. 1 and 3 are exemplifying and can be modified, for example for adaptation and integration of the high-bay warehouse 1 to the conditions of a container terminal. Thus, for example, the containers 4 can be delivered and/or discharged, alternatively or additionally, to the ends 8, 9 at the longitudinal sides of the high-bay warehouse 1.

Figure 2:
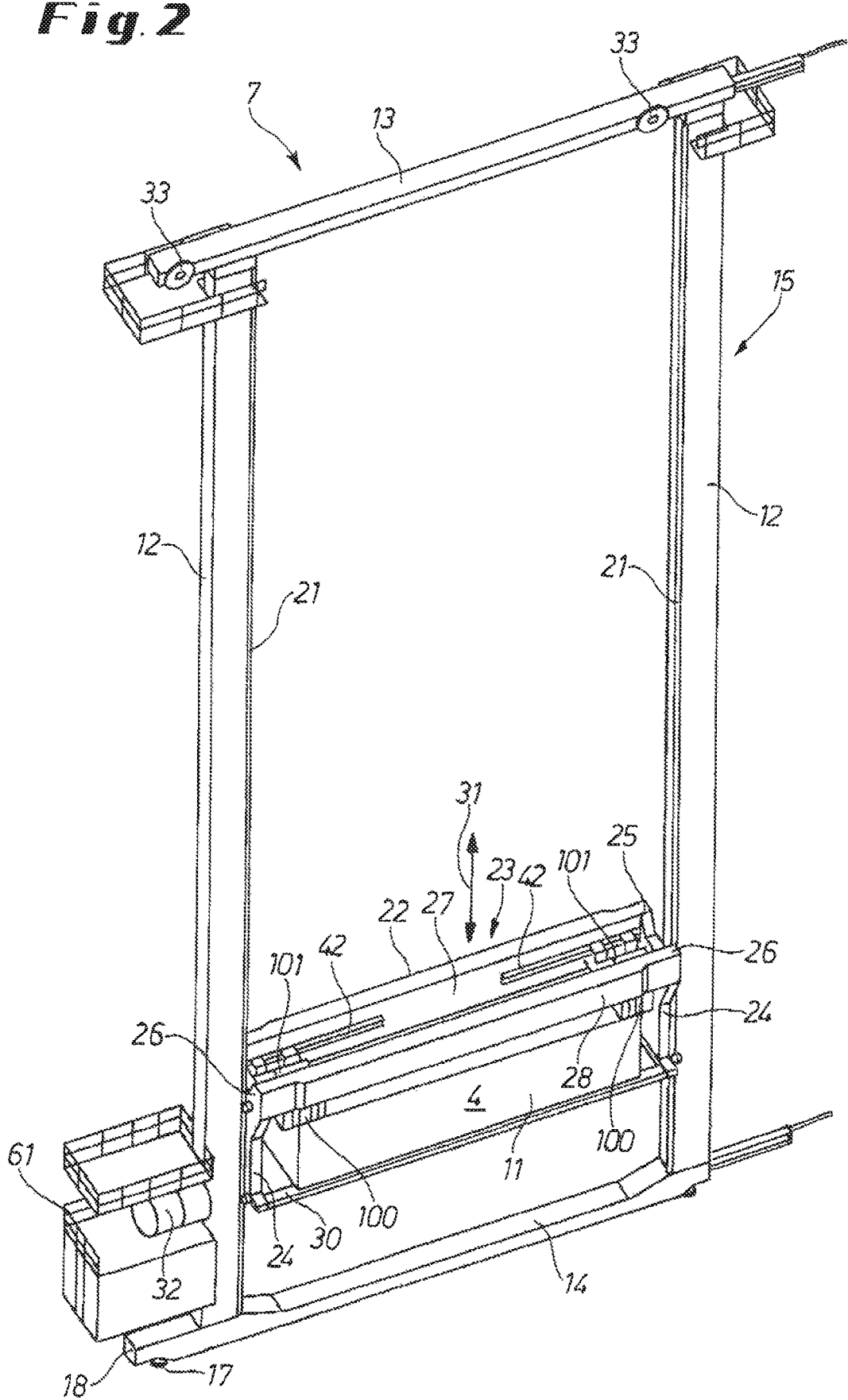
FIG. 2 is a perspective view which shows a storage and retrieval unit in schematic manner.

FIG. 2 is a perspective view of a storage and retrieval unit 7 according to an embodiment. The storage and retrieval unit 7 comprises a frame 15, the height of which is designed so that all rack bays 3 (as seen in height direction) of a multi-level storage module 2 are reachable. The frame 15 comprises two vertical posts 12, as well as a head beam 13 and a foot beam 14, which connect the two vertical posts 12 together.

The storage and retrieval unit 7 is movable by means of a travel drive 16 (cf. FIG. 3) along an associated travel lane 6, wherein in this case a driven gearwheel 17 is integrated in the end region 18 of the foot beam 14 and the rack 19 to be engaged is arranged in the floor 20 of the travel lane 6, as illustrated in FIG. 3. However, the movability of the storage and retrieval unit 7 can also be realised in a technically different way.

The vertical posts 12 of the storage and retrieval unit 7 are constructed with guides 21 in which a lifting bridge 22 of a lifting device 23 runs. The lifting bridge 22 has lateral posts 24, which widen upwardly in fork-like manner, and parallelly extending longitudinal beams 27 and 28, which connect the lateral posts 24 together at the two mutually opposite fork ends 25, 26 to form a frame. In order to stiffen the lifting device 23, parallelly extending foot struts 29 and 30 are provided at the lower end of the lateral posts 24 and bridge over the lateral posts 24 (cf. for that purpose FIGS. 4, 5 and 6).

The raising and lowering of the lifting bridge 22, illustrated by a double arrow 31 in FIG. 2, is realised in accordance with the present embodiment by a cable pull device, of which in FIG. 2 merely the cable pull drum 32 and the deflecting rollers 33 arranged at the head beam 13 of the storage and retrieval unit 7 are illustrated. It may be mentioned that the raising and lowering of the lifting bridge 22 can also be realised in a technically different manner.

Moreover, the storage and retrieval unit 7 comprises a platform construction 61 arranged at the vertical post 12 and the end region 18 of the foot beam 14. The platform construction 61 receives the equipment needed for the lifting device 23, for the travel drive 16 of the storage and retrieval unit 7 and for control of the telescopic pick-ups 100 (described in detail further below).

The length of the lifting bridge 22 or of the lifting device 23 is designed for picking up a container 4, which has the greatest existing container length of, for example, 1 FEU (Forty-foot Equivalent Unit, i.e. 40 foot ISO container). However, in addition containers 34 having the smallest existing container length of, for example, 1 TEU (Twenty-foot Equivalent Unit, i.e. 20 foot ISO container) shall also be able to be picked up and transported by the lifting device 23 (cf. for that purpose FIGS. 4 and 5).

Figure 6:
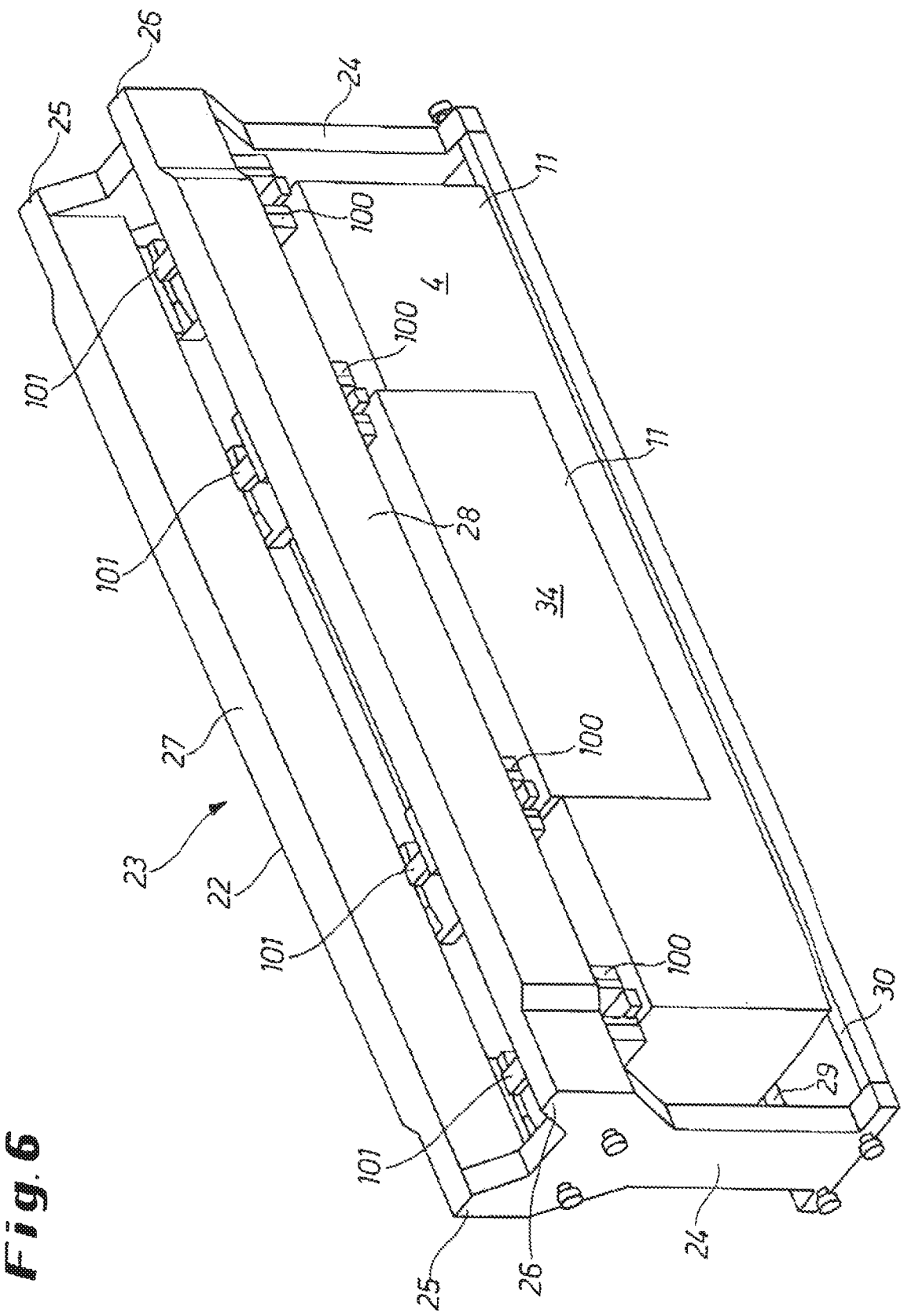
FIG. 6 is a perspective view which shows in schematic manner the lifting device of a storage and retrieval unit with a picked-up container, according to a further embodiment.

FIG. 6 shows an embodiment in which for picking up a container 4, 34 two stationary inner telescopic pick-ups 100 for picking up the shorter container 34 and two appropriately further mutually spaced-apart outer telescopic pick-ups 100 for picking up the longer container 4 are provided at the longitudinal beams 27 and 28 of the lifting bridge 22. The stationary telescopic pick-ups 100 are attached by the main housings 101 thereof to the lower sides of the longitudinal beams 27 and 28 and, in particular, with the inner one offset in height relative to the outer one.

Figure 4:
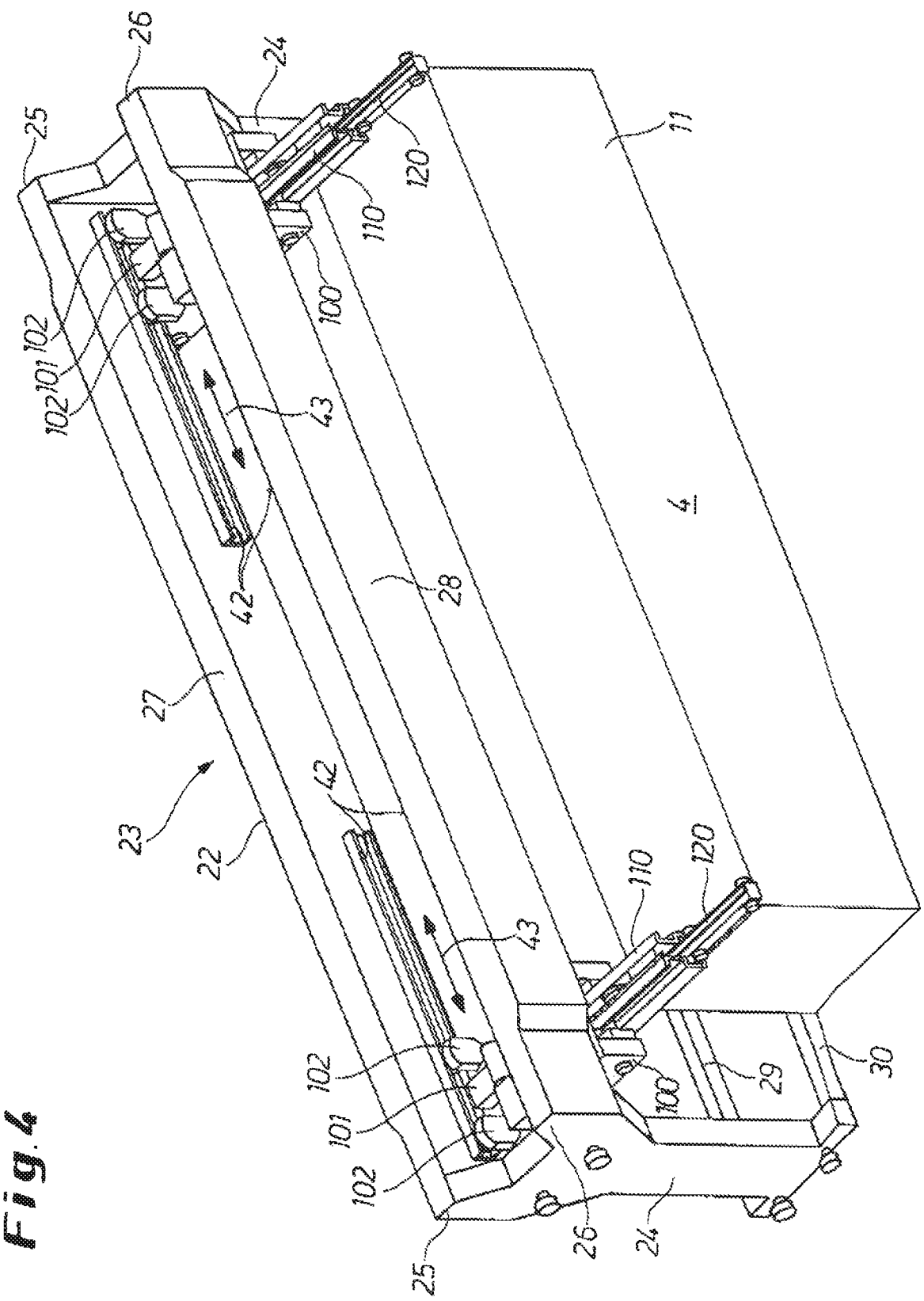
FIG. 4 is a perspective view which shows in schematic manner the lifting device of a storage and retrieval unit with a picked-up container, according to an embodiment.
Figure 5:
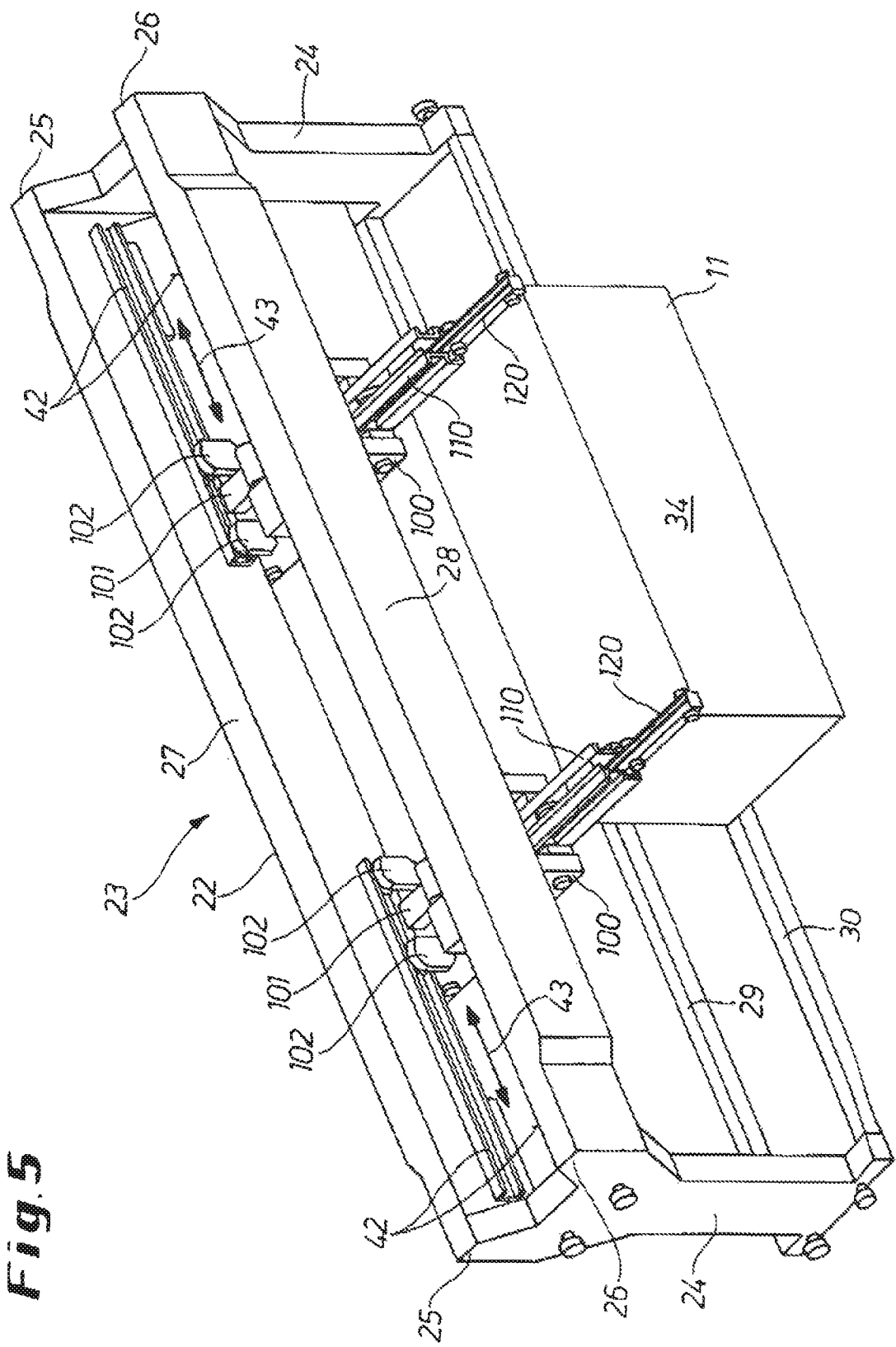
FIG. 5 is a perspective view which shows in schematic manner the lifting device of FIG. 4, wherein a container with a smaller length dimension is picked up.

According to an embodiment shown in FIGS. 4 and 5, only two telescopic pick-ups 100 are provided, which pick-ups are movable in linear guides 42 of the longitudinal beams 27 and 28 and can thus be positioned in correspondence with the length of the container 34 or the container 4 by a movement towards or away from one another, as illustrated by a double arrow 43. The telescopic pick-ups 100 are, for example, held and moved by way of double rollers in the linear guides 42. The double rollers are rotatably mounted by support blocks 102, which can be mounted at a main housing 101 of the telescopic pick-up 100.

Figure 7:
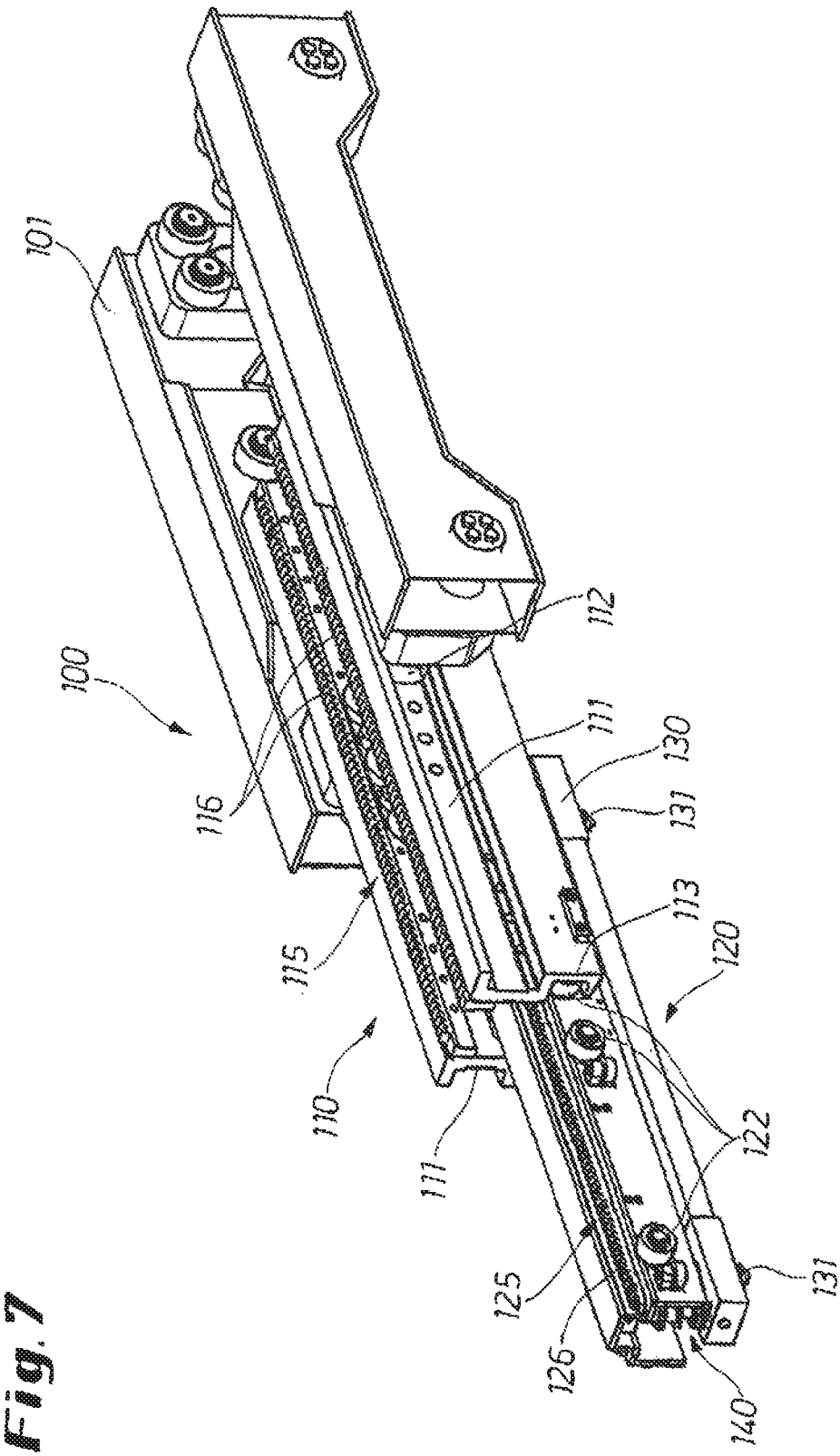
FIG. 7 is a perspective view which shows the basic construction of a telescopic pick-up for a storage and retrieval unit according to an embodiment.

FIG. 7 shows in detail the construction of a telescopic pick-up 100 according to an embodiment, wherein components such as, for example, possible support blocks 102 with double rollers mounted thereon have been omitted for the sake of clarity. The telescopic pick-up 100 can be used as a movable telescopic pick-up 100 according to the embodiment of FIGS. 4 and 5 or also as a stationary telescopic pick-up 100 according to the embodiment of FIG. 6.

The main housing 101 of the telescopic pick-up 100 receives an outer telescopic arm 110 and an inner telescopic arm 120. The outer telescopic arm 110 has along the length direction thereof two outer guide profiles 111 which co-operate with guide rollers 112 rotatably mounted on the base housing 101, whereby the outer telescopic arm 110 is movable in and out relative the base housing 101 substantially perpendicularly to the plane of the frame 15. The outer telescopic arm 110 further has along the length direction thereof two inner guide profiles 113 which co-operate with guide rollers 122, which are rotatably mounted on the inner telescopic arm 120, whereby the inner telescopic arm 120 is movable in and out relative to the outer telescopic arm 110 substantially perpendicularly to the plane of the frame 15.

Movement in and out movement of the outer and inner telescopic arms 110 and 120 take place respectively by way of rack drives 115 and 125. In the case of the rack drive 115 for the outer telescopic arm 110, two racks 116 are provided between the outer guide profiles 111. One or more pinions which mesh with the racks 116 are—although not illustrated—arranged at the upper side of the main housing 101. In the case of the rack drive 125 for the inner telescopic arm 120 two racks 126 are provided on the telescopic arm 120 itself. One or more pinions which mesh with the racks 126 are—although not illustrated—arranged between the outer guide profiles 111 of the outer telescopic arm 110. It may be mentioned that the telescopic mechanism can also be realised in a technically different manner.

According to the present embodiment, in order to hold a container 4 or 34 a pick-up 130 is provided at the lower side of the inner telescopic arm 120, which pick-up has so-called twist-lock bolts 131 for locking with the containers 4 and 34. The twist-lock bolts 131 are arranged so as to engage in corresponding openings of the container 4 or 34 and so lock that the container 4 or 34 can be reliably transported and, after storage, separated from the pick-up 130.

Figure 8:
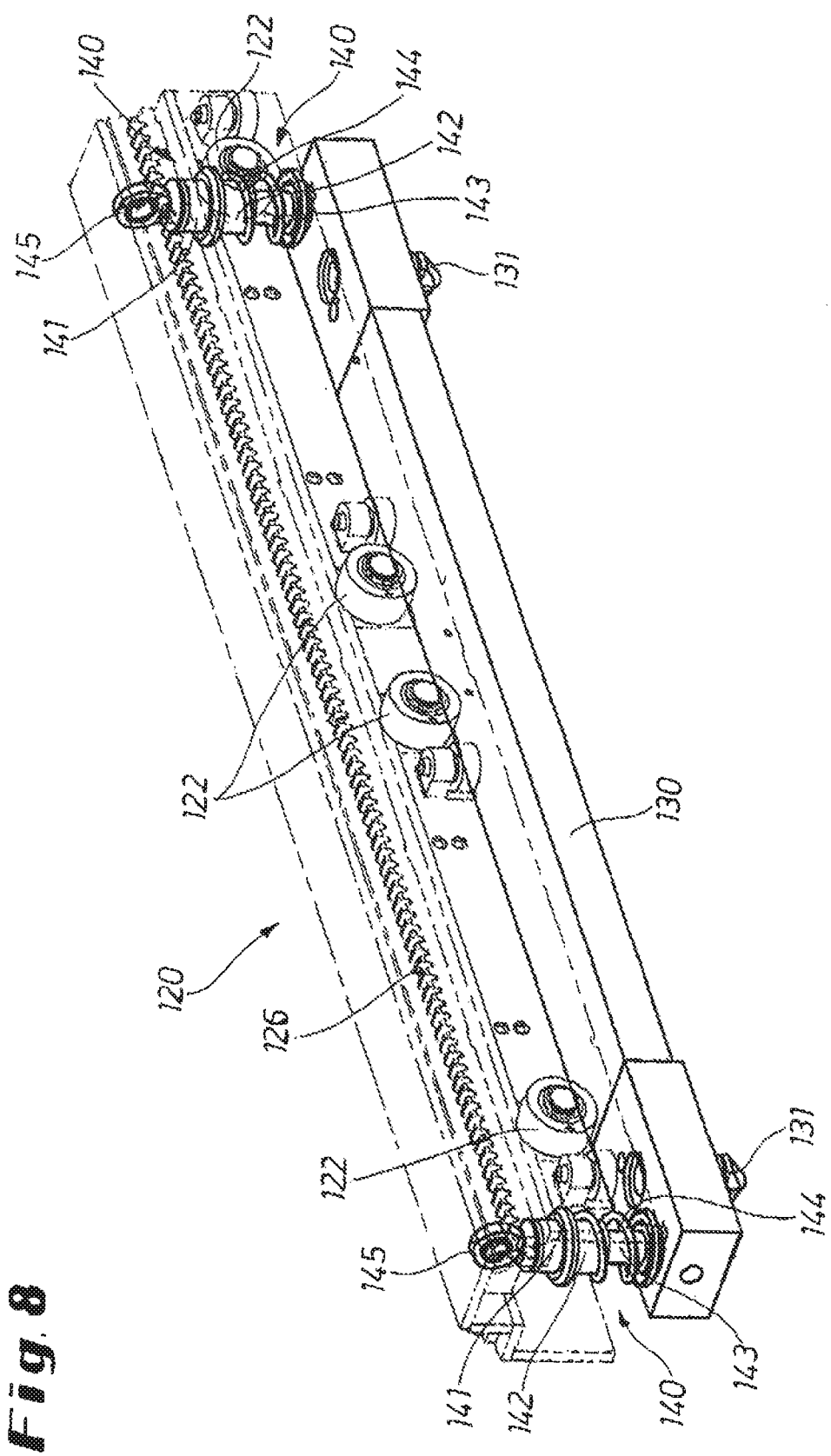
FIG. 8 is a perspective view which shows the interior of a telescopic arm of a telescopic pick-up with a pick-up supported in floating manner.
Figure 9:
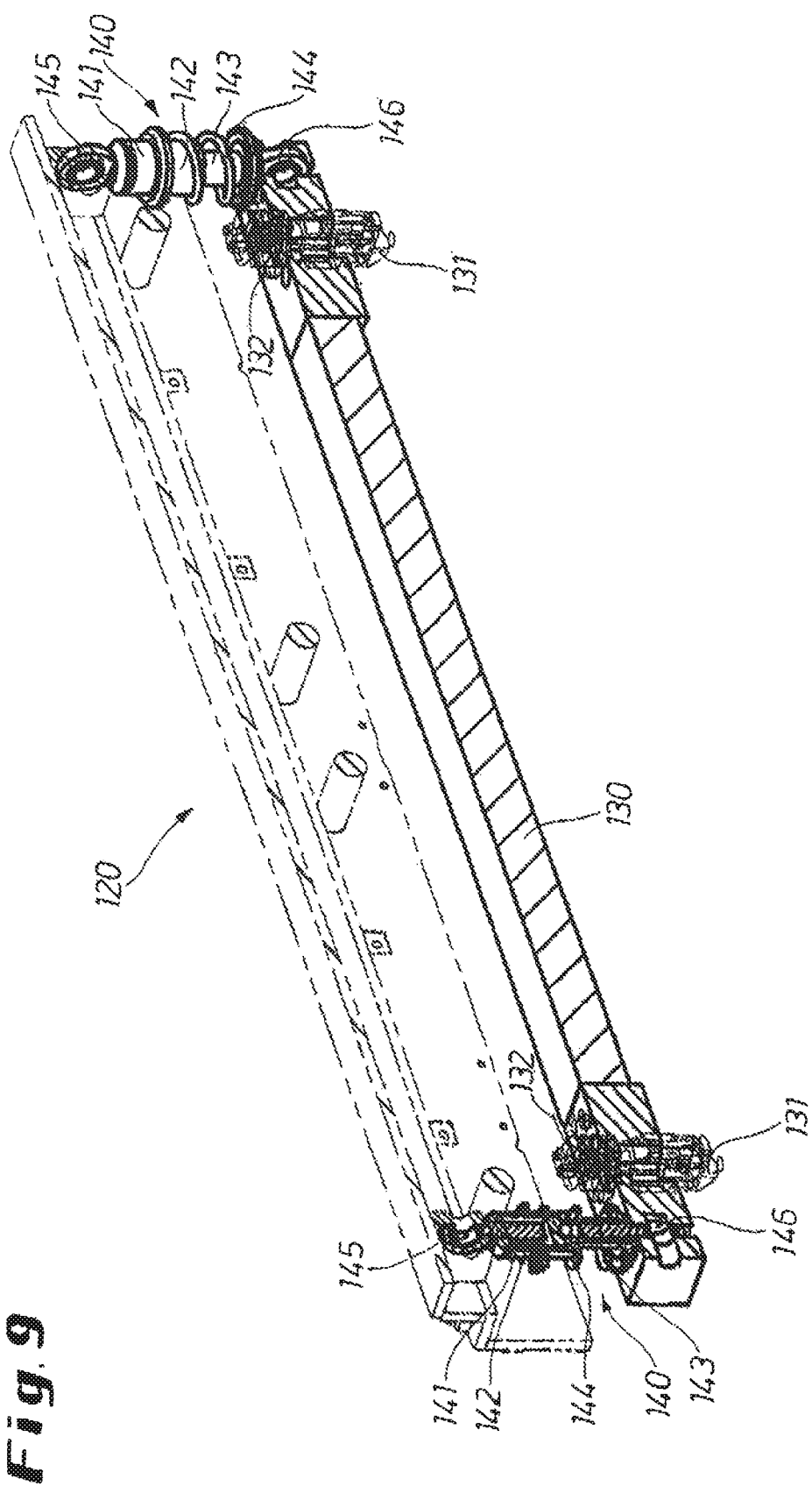
FIG. 9 shows a longitudinal section of the telescopic arm according to the embodiment of FIG. 8.
Figure 10:
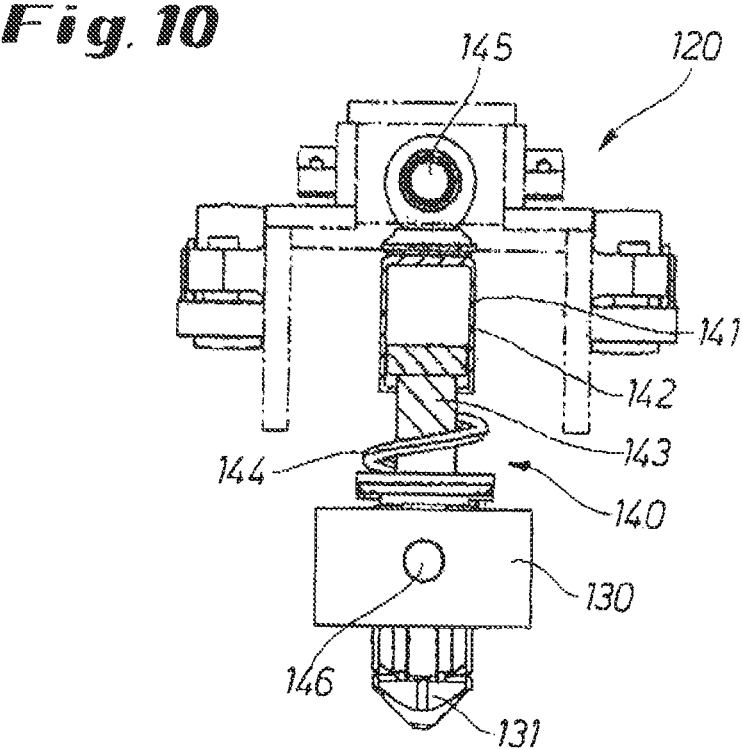
FIG. 10 shows a cross-section of the telescopic arm perpendicularly to the extension direction, according to the embodiment of FIG. 8.
Figure 11A:
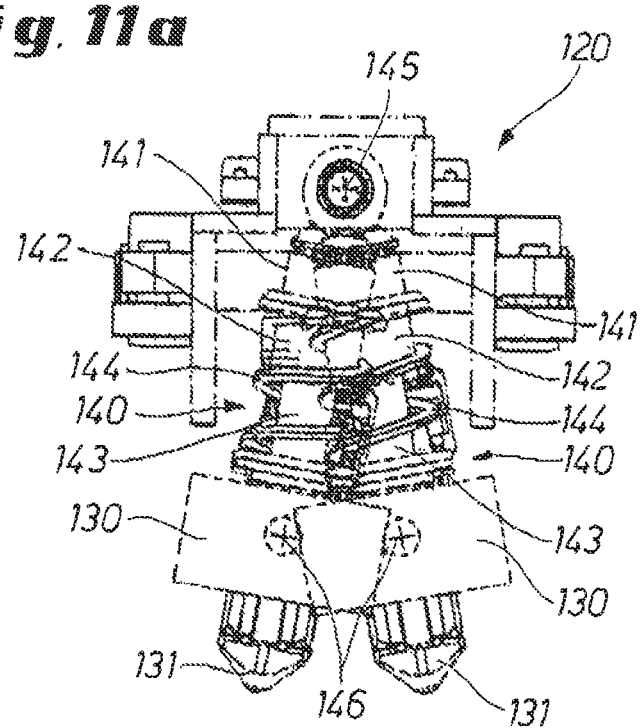
FIGS. 11a to 11e show in schematic manner the mode of functioning and degrees of freedom of the floating support of the telescopic arm according to the embodiment of FIG. 8.
Figure 11B:
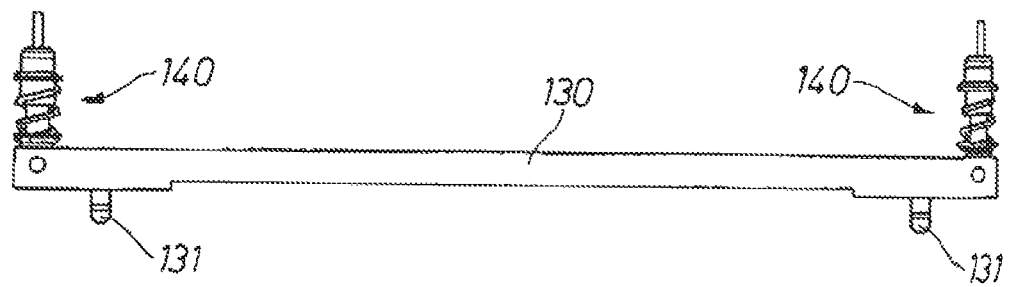
Figure 11C:
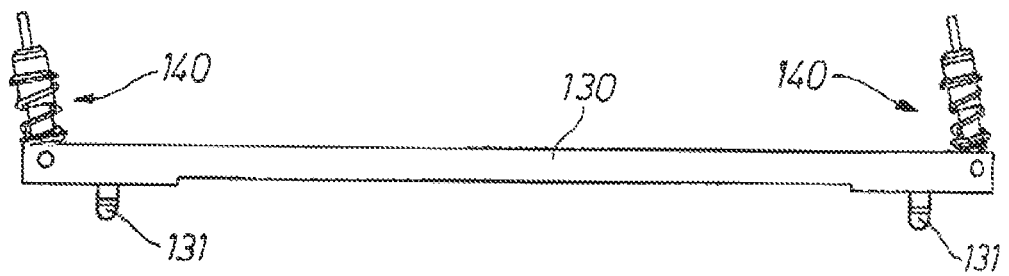
Figure 11D:
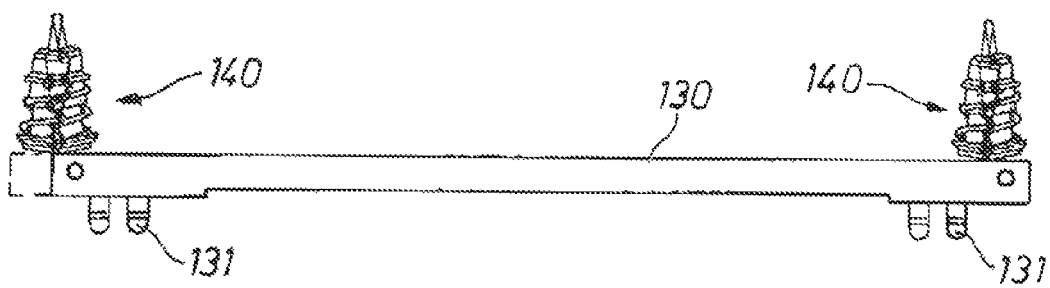
Figure 11E:
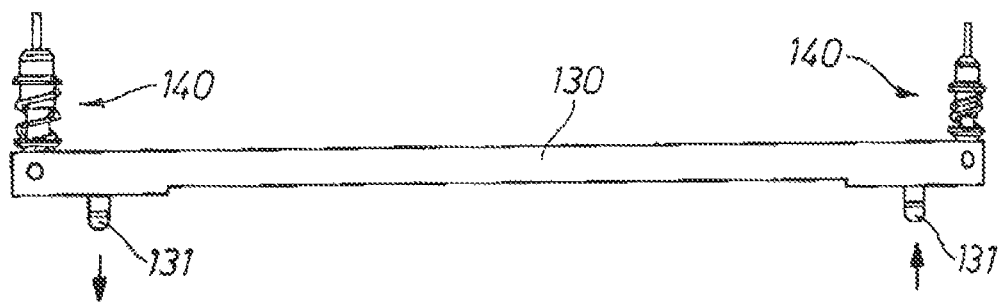

The pick-up 130 is supported to be movable or floating so as to provide compensation for production tolerances of the container 4 or 34, deformations and the like and to simplify precise positioning of the container 4 or 34. An embodiment of the floating support, which realises compensating movements in three dimensions, is described in the following:

The perspective schematic illustration of FIG. 8 allows a view into the interior of the inner telescopic arm 120 with pick-up 130 supported in floating manner, wherein the mechanisms for actuation of the twist-lock bolts 131 have been omitted for the sake of clarity. FIG. 9 shows a longitudinal section of the inner telescopic arm 120 inclusive of the mechanisms 132 for actuation of the twist-lock bolts 131. FIG. 10 shows a cross-section of the inner telescopic arm 120 perpendicularly to the direction of extension of the telescopic pick-up 100.

Two supports 140 at which the pick-up 130 is suspended at both ends in extension direction of the telescopic pick-up 100 are evident from FIGS. 8 to 10. For this purpose, the supports 140 are respectively mounted at the interior of the telescopic arm 120 and connected with the pick-up 130.

The supports 140 each comprise a respective cylinder/piston device 141, whereby vertical movability of the pick-up 130 is realised. For that purpose the cylinder/piston device 141 comprises a cylinder 142, a piston 143 displaceably mounted therein and a spring 144, which in the present embodiment is formed as a helical spring and is provided at the outside around the cylinder/piston device 141, the spring being so arranged that a resilient vertical flexibility is achieved. Movability along the vertical axis can obviously also be achieved in a different technical way, for example by a hydraulically or pneumatically actuable cylinder/piston device or a pure spring support.

According to a preferred embodiment the load at the pick-up 130, i.e. the vertical force, is measured by force cells (not illustrated) and monitored by means of a monitoring system. In this way it is possible for forces which act at, for example, different places of the telescopic pick-up 100 to be kept below a maximum loading so as to avoid excessive loading and damage.

According to the present embodiment, in order to make possible movability of the pick-up 130 also in the horizontal plane the cylinder/piston device 141 is mounted like a pendulating rod by way of a joint 145 at the inner telescopic arm 120. Alternatively or additionally thereto the pick-up 130 can also be mounted on the cylinder/piston device 141 by way of a joint 146. The joint 145 and/or the joint 146 is or are preferably a ball joint.

The mode of functioning of the above-described floating support of the pick-up 130, particularly the achievable degrees of freedom, is evident from the schematic illustrations of FIGS. 11a to 11e. Thus, for example, movability of the pick-up 130 along the vertical axis of up to +/−80 mm and pendulating movements in the horizontal plane of up to 20° are realisable. In addition, compensation can be provided for an angular offset as evident from FIG. 11e. The floating support is preferably so arranged that movability of the pick-up 130 of up to +/−30 mm along one axis or both axes in the horizontal plane and +/−80 mm along the vertical axis can be realised.

In the present embodiment the support is executed to be passive, i.e. like a pendulum or freely oscillating. However, according to a further embodiment the support can be executed in such a way that one or more degrees of freedom are actively controllable by means of appropriate actuators.

A storage procedure for a container 4 in the high-bay warehouse 1 is described in the following with reference to FIGS. 1 to 4.

The storage and retrieval unit 7 with fully retracted outer and inner telescopic arms 110 and 120 is moved by way of the travel drive 16 in the travel lane 6 up to the front end 8 of the high-bay warehouse 1 so as to pick up a container 4. The container 4 is delivered there with its longitudinal axis parallel to the high-bay warehouse 1 at a side near the travel lane 6. For picking up, the telescopic pick-ups 100 are adjusted in correspondence with the format of the container 4 to be picked up. The outer and inner telescopic arms 110 and 120 are subsequently extended by means of the rack drives 115 and 125 thereof over the container 4 and in a given case lowered over the container suspension points. The container is now locked to the pick-ups 130 of the participating telescopic pick-ups 100 by the twist-lock bolts 131.

After the locking, the outer and inner telescopic arms 110 and 120 together with the suspended container 4 are raised by lifting the lifting bridge 22 and retracted by way of the rack drives 115 and 125 into the storage and retrieval unit 7 or below the lifting bridge 22 until the container 4 adopts a suspended position or transport position, which is aligned in the plane with the travel lane 6, in the storage and retrieval unit 7.

The storage and retrieval unit 7 is thereupon moved by way of the travel drive 16 in the travel lane 6 to in front of a rack bay 3, which is to be occupied, of a storage module 2 and the lifting bridge 22 together with the suspended container 4 is positioned for the horizontal, telescoping handing process. The container 4 can now be telescoped into the rack compartment 3 by extension of the outer and inner telescopic arms 110 and 120 with its longitudinal side 11 foremost and be deposited thereat by lowering the lifting bridge 22 onto the corner point supports 5.

After the locking of the container 4 has been removed by unlocking the twist-lock bolts 131 the outer and inner telescopic arms 110 and 120 are raised and moved by way of the rack drives 115 and 125 into the retracted starting position thereof below the lifting bridge 22 so that the storage and retrieval unit 7 is ready for a new storage, removal from storage or transfer process.

In the case of removal of a container 4 from storage in a rack bay 3 by means of the storage and retrieval unit 7 the preferably fully automatically controlled travel, lifting, telescoping and locking movements are reversed with respect to the afore-described storage procedure, in which case the container 4 is then brought to the rear end 9 of the high-bay warehouse 1.

Figure 12:
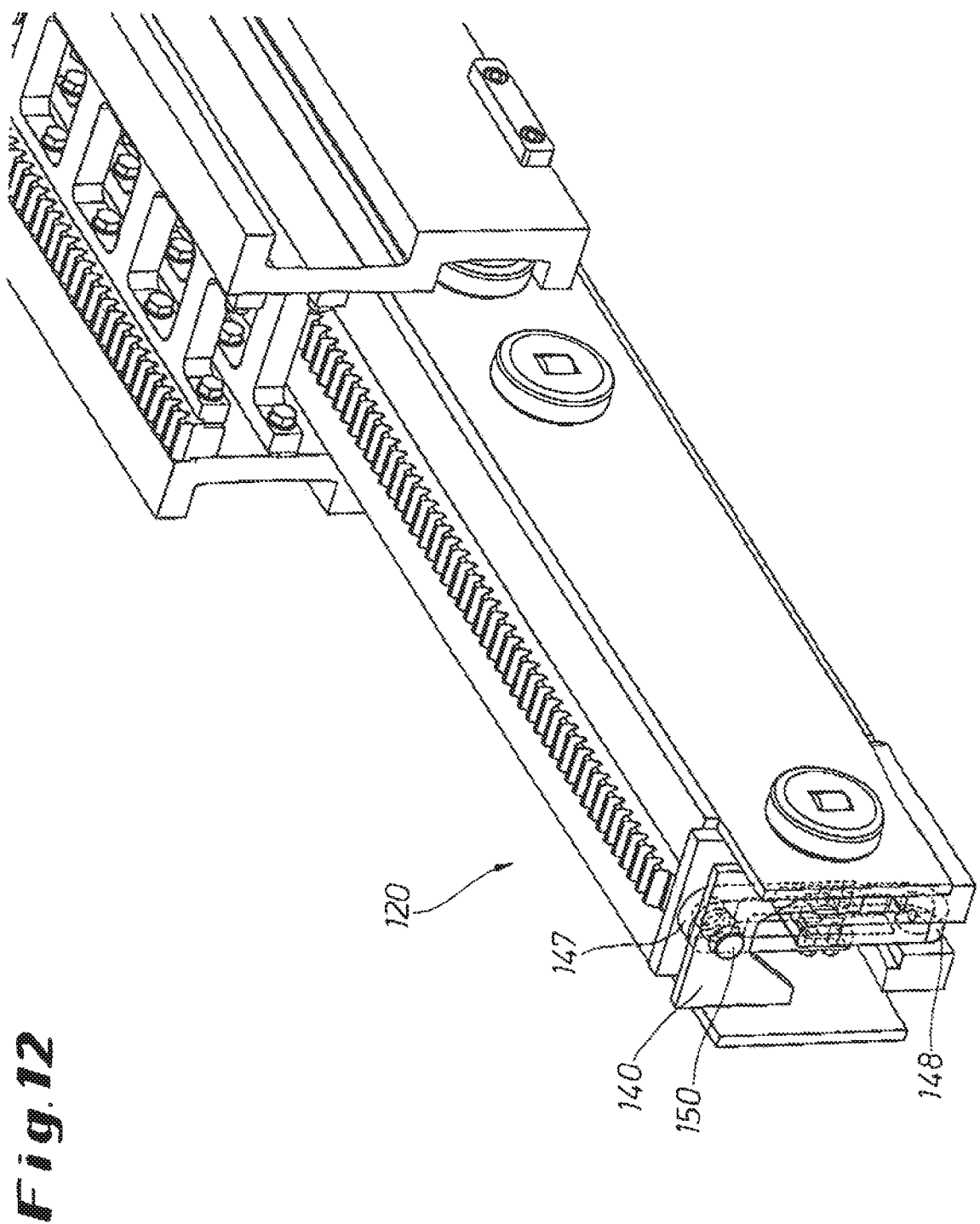
FIG. 12 shows a perspective view showing the inner telescopic arm of a telescopic pick-up for a storage and retrieval unit according to a further embodiment.

FIG. 12 shows an inner telescopic arm 120 which in distinction from the form of embodiment according to FIG. 8 has, as support 140, two straps 147, 148 which are connected in pendulating manner with the inner telescopic arm 120 by way of a joint 150. The straps 147, 148 are so suspended in interengagement at the joint 150 that they are movable in a first direction about the longitudinal axis of the joint 150 and in addition also in a pendulating movement perpendicularly thereto by virtue of the engagement of the strap 148 in the strap 147.

FIG. 13 shows a perspective view of a form of embodiment of the support 140 according to FIG. 13. The support 140 substantially consists of two substantially identical strap elements 147, 148 which are detachably connected together by way of two bolts 149a, 149b and which are each provided at their first end, which is remote from the bolts 149a, 149b, with a round bore for reception of a joint (see FIG. 12), which is not illustrated, and a joint arranged at a pick-up, which is not illustrated. Arranged at the respective other end of the straps 147, 148 are slots along which the straps 147, 148 are guided to be movable relative to one another in the longitudinal direction thereof or vertically. The strap 148 has a strap limb 148a at its second end, by way of which a pendulating movement of the strap 148 about the longitudinal axis of the strap limb 148a is made possible with respect to the strap 147. For that purpose, the strap limb 148a rests on the bolt 149a which connects the two longitudinal limbs of the strap 147a together.

Insofar as feasible, all individual features illustrated in the embodiments can be combined with one another and/or exchanged.

REFERENCE NUMERAL LIST 1 high-bay warehouse
2 storage module
3 rack bay
4 container (40 FEU)
5 corner point support
6 travel lane
7 storage and retrieval unit
8, 9 end
10 transport vehicle
11 longitudinal side
12 vertical post
13 head beam
14 foot beam
15 frame
16 travel drive
17 gearwheel
18 end region
19 rack
20 floor
21 guide
22 lifting bridge
23 lifting device
24 lateral post
25, 26 fork end
27, 28 longitudinal beam
29, 30 foot strut
31 double arrow (lifting/lowering directions of the lifting bridge)
32 cable pull drum
33 deflecting roller
34 container (20 TEU)
42 linear guide
43 double arrow (adjusting direction of the telescopic pick-up)
61 platform construction
100 telescopic pick-up
101 main housing
102 support block
110 outer telescopic arm
111 outer guide profile 112 guide roller
113 inner guide profile
115 rack drive
116 rack
120 inner telescopic arm
122 guide roller
125 rack drive
126 rack
130 pick-up
131 twist-lock bolt
132 mechanism for actuating the twist-lock bolt
140 support
141 cylinder/piston device
142 cylinder
143 piston
144 spring
144, 146 joint
147, 148 strap elements
148a strap limb
149 bolt
150 joint

The invention claimed is:

1. A telescopic pick-up (100) for picking up and moving a container (4, 34) in a high-bay warehouse (1), comprising:
a displaceable telescopic arm (120) at which a pick-up (130) for holding the container (4, 34) by way of a support (140) is mounted,
wherein the support (140) supports the pick-up (130) to be movable along at least one direction relative to the displaceable telescopic arm (120),
wherein the support (140) comprises at least one cylinder/piston device (141) with a cylinder (142) and a piston (143) received therein to be displaceable, and
wherein the cylinder/piston device (141) is mounted at one end on the displaceable telescopic arm (120) and at an opposite end on the pick-up (130) and is so arranged that the pick-up (130) is vertically movable relative to the displaceable telescopic arm (120).

2. The telescopic pick-up (100) according to claim 1, wherein the container (4, 34) can be picked up by the pick-up (130) to be suspended, and
wherein the pick-up (130) comprises one or more twist-lock bolts (131) which are arranged to engage in corresponding openings at the container (4, 34) and to lock these to the pick-up (130).

3. The telescopic pick-up (100) according to claim 1, wherein in that the cylinder/piston device (141) further comprises a spring (144) so arranged that the cylinder/piston device (141) can be extended and shortened in resilient manner by displacement of the piston (143) in the cylinder (142).

4. The telescopic pick-up (100) according to claim 1, wherein two cylinder/piston devices (141) are provided spaced apart in a direction of displacement of the displaceable telescopic arm (120).

5. The telescopic pick-up (100) according to claim 1, further comprising a displaceable outer telescopic arm (110),
wherein the displaceable telescopic arm (120) is an inner telescopic arm which is mounted and guided by the displaceable outer telescopic arm (110) to be displaceable along a displacement direction of the displaceable outer telescopic arm (110) and relative thereto.

6. The telescopic pick-up (100) according to claim 5, wherein the displaceable outer telescopic arm (110) has along the displacement direction thereof one or more outer guide profiles (111) co-operating with guide rollers (112), which are rotatably mounted at a main housing (101) of the telescopic pick-up (100), for displacement of the displaceable outer telescopic arm (110), and
the displaceable outer telescopic arm (110) further has along the displacement direction thereof one or more inner guide profiles (113) co-operating with guide rollers (122), which are rotatably mounted on the inner telescopic arm (120), for displacement of the inner telescopic arm (120).

7. A telescopic pick-up (100) for picking up and moving a container (4, 34) in a high-bay warehouse (1), comprising:
a displaceable telescopic arm (120) at which a pick-up (130) for holding the container (4, 34) by way of a support (140) is mounted; and
a rack drive (125) with at least one rack (126) and at least one pinion meshing with the rack (126),
wherein the support (140) supports the pick-up (130) to be movable along at least one direction relative to the displaceable telescopic arm (120), and
wherein the rack drive (125) is so arranged that a rotational movement of the pinion is converted into a linear movement of the rack (126), whereby the displaceable telescopic arm (120) is displaceable.

8. A storage and retrieval unit (7) for moving containers (4, 34) in a high-bay warehouse (1), comprising:
a raisable and lowerable lifting bridge (22) at which at least one telescopic pick-up (100) according to claim 1 is mounted.

9. The storage and retrieval unit (7) according to claim 8, wherein the telescopic pick-up (100) is so arranged and equipped that the containers (4, 34) are held at the pick-up (130) of the telescopic pick-up (100) with a longitudinal side perpendicular to a displacement direction, whereby storage of the containers (4, 34) in a rack bay (3) of the high-bay warehouse (1) with the longitudinal side foremost can be realized.

10. The storage and retrieval unit (7) according to claim 8,
wherein more than two telescopic pick-ups (100) are provided and/or
wherein the at least one telescopic pick-up (100) is provided at the lifting bridge (22) to be adjustable, whereby containers (4, 34) of different formats can be handled by the storage and retrieval unit (7).

11. A high-bay warehouse (1), comprising:
at least one travel lane (6) and at least one storage and retrieval unit (7) according to claim 8 which is movable along the travel lane (6) of the high-bay warehouse.

12. The high-bay warehouse (1) according to claim 11, further comprising a plurality of multi-level rack bays (3) arranged for storage of containers (4, 34),
wherein the rack bays (3) are formed with corner point supports (5) for reception of the containers (4, 34).

13. A telescopic pick-up (100) for picking up and moving a container (4, 34) in a high-bay warehouse (1), comprising:
a displaceable telescopic arm (120) at which a pick-up (130) for holding the container (4, 34) by way of a support (140) is mounted,
wherein the support (140) supports the pick-up (130) to be movable along at least one direction relative to the displaceable telescopic arm (120), and
wherein the support (140) comprises at least one pendulating rod which is mounted by way of at least one joint (145, 146) on the displaceable telescopic arm (120) and/or the pick-up (130) so that the pick-up (130) is movable relative to the displaceable telescopic arm (120) substantially in a horizontal plane.

14. The telescopic pick-up (100) according to claim 13,
wherein the at least one pendulating rod is a cylinder/
piston device (141) with a cylinder (142) and a piston
(143) received therein to be displaceable, and
wherein the cylinder/piston device (141) is mounted at
one end on the displaceable telescopic arm (120) and at
an opposite end on the pick-up (130) and is so arranged
that the pick-up (130) is vertically movable relative to
the displaceable telescopic arm (120).

15. A telescopic pick-up (100) for picking up and moving a container (4, 34) in a high-bay warehouse (1), comprising:
a displaceable telescopic arm (120) at which a pick-up
(130) for holding the container (4, 34) by way of a
support (140) is mounted,
wherein the support (140) supports the pick-up (130) to be
movable along at least one direction relative to the
displaceable telescopic arm (120), and
wherein the support (140) comprises at least two strap
elements (147, 148) which are arranged to interengage
and to be movable relative to one another and which
allow at least a movement in a first direction and in a
second direction perpendicular to the first direction.

16. The telescopic pick-up (100) according to claim 15,
wherein the at least two strap elements (147, 148) are
detachably interconnectible by way of at least one bolt
(149).

\* \* \* \* \*